United States Patent [19]

Iles et al.

[11] 4,165,972
[45] Aug. 28, 1979

[54] GAS SEPARATING SYSTEM

[75] Inventors: Thomas L. Iles; Joseph M. Ruder, both of Rancho Palos Verdes, Calif.

[73] Assignee: The United States of America as represented by the Secretary of the Navy, Washington, D.C.

[21] Appl. No.: 838,598

[22] Filed: Oct. 3, 1977

[51] Int. Cl.² .............................................. B01D 53/04
[52] U.S. Cl. .................................... 55/28; 55/74; 55/162; 55/179; 55/208; 55/387; 423/579
[58] Field of Search ............... 55/28, 58, 62, 74, 162, 55/163, 179, 208, 387, 33; 423/579

[56] References Cited

U.S. PATENT DOCUMENTS

| | | | |
|---|---|---|---|
| 1,934,075 | 11/1933 | Lewis | 55/179 X |
| 2,450,276 | 9/1948 | Fogler et al. | 423/579 |
| 2,535,902 | 12/1950 | Dailey, Jr. | 55/179 X |
| 2,661,808 | 12/1953 | Kahle | 55/74 |
| 3,007,543 | 11/1961 | Maher | 55/33 |
| 3,016,978 | 1/1962 | Hull | 55/179 |
| 3,221,476 | 12/1965 | Meyer | 55/28 |
| 3,359,706 | 12/1967 | Zankey | 55/163 X |
| 3,405,507 | 10/1968 | Spencer et al. | 55/62 |
| 3,584,441 | 6/1971 | Strimling | 55/162 |
| 3,715,866 | 2/1973 | Chatlos et al. | 55/179 |
| 3,766,713 | 10/1973 | Leonard | 55/163 X |
| 3,884,661 | 5/1975 | Simonet | 55/62 |
| 3,950,154 | 4/1976 | Henderson et al. | 55/179 |
| 4,011,306 | 3/1977 | Fox | 423/579 |

OTHER PUBLICATIONS

Boscola, E. J., In–Flight Oxygen Generation for Aircraft Breathing Systems, Journal of Aircraft, 11(8), pp. 444–448, Aug. 1974.

Primary Examiner—Robert H. Spitzer
Attorney, Agent, or Firm—R. S. Sciascia; Henry Hansen; Stanton D. Weinstein

[57] ABSTRACT

A gas generator which separates a gas such as oxygen from a gas mixture such as air using a sorbent process. A sorbent contained in a fixed cooled bed absorbs the gas from the mixture; simultaneously a second bed of sorbent which previously absorbed the gas is heated and the gas is thereby desorbed from the sorbent. After a given time, the functions of the beds are exchanged. Heating and cooling of the two sorbent beds is accomplished by means of coolant which passes through each bed. Immediately after the functions of the beds are switched, the cool coolant first flows through and cools the absorbing bed, then is valved to a pump and to the heater for heating and then is valved to heat the second sorbent bed before being valved to a cooler for cooling. A set time thereafter, but before the functions of the beds are again switched, coolant from the absorbing bed is valved directly to coolant return, and coolant from the heater is valved to the desorbing bed and therefrom back to the pump and heater in a closed loop to conserve heat transferred to the coolant by the heater. Such heat would otherwise be lost when the coolant is cooled upon being valved to the cooler. The set time is selected so that when the temperature of the coolant exiting from the absorbing bed equals the temperature of the coolant exiting from the desorbing bed, the closed heating loop is instituted.

8 Claims, 2 Drawing Figures

GAS SEPARATING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to gas generating systems, and more particularly to gas generating systems employing solid sorbent to sorb a gas from a mixture and supply it to a user.

For all aircraft which carry an aircrew, particularly those aircraft capable of flying at high altitudes, provision must necessarily be made for enabling the aircrew to breathe. Oxygen systems currently in use such as on high performance military aircraft provide flight crew breathing oxygen from liquid oxygen vessels. Although such devices have served the purpose, they have not proved entirely satisfactory under all conditions of service because flight mission time is necessarily limited by the capacity of such vessels. Also, there are problems involved in supplying liquid oxygen for these vessels, especially at remotely located bases, whether the liquid oxygen is produced on-site with ground-based liquid oxygen plants and associated cryogenic equipment requiring support or is transported from an outside source of supply. In addition, providing liquid oxygen to such a vessel involves handling difficulties.

Other gases could also be supplied to a user via liquid or pressurized gas containers, but with similar problems of limited capacity, and supply, servicing and maintenance requirements.

Previous systems involving separation of a gas from a mixture thereof have employed one or more absorbers, alternately absorbing and desorbing the gas from the mixture according to whether the absorber is cooled or heated. While such systems have served the purpose, they have not proved entirely satisfactory under all conditions of service because of the substantial heating and cooling loads which such systems can require resulting in utilization of substantial heating and cooling systems.

SUMMARY OF THE INVENTION

Accordingly, it is the general purpose of the invention to provide a gas generating system capable of supplying oxygen or other gas to a user.

Other objects of the present invention are to provide a gas generation system which is practically self-contained, with increased duration of gas production, and which is easy to handle, service, supply and maintain.

Further objects of the present invention are to provide a temperature control system for a gas generating system which efficiently utilizes heating and cooling services, reduces the heating and cooling load on and required capacity of such utilized services, improves efficiency of operation of the gas generating system, and reduces overall system weight.

A still further object of the present invention is to provide an oxygen generating system capable of extending flight mission time.

Briefly, these and other objects of the present invention are accomplished by a pair of heat exchangers/beds of sorbent material, each bed being alternately cooled and heated by heat-conductive fluid to alternately sorb and desorb a gas such as oxygen from a mixture of gases such as air. The sorbent is contained in a heat exchanger, for example a plate fin heat exchanger; the exchanger is thus a sorbent bed. The gas is generated by flowing the mixture through the sorbent. Heat-conductive fluid is cyclicly provided to the two beds to provide heating and cooling thereof. During one portion of the cycle, heat-conductive fluid such as coolant is provided in series from a cooler to one bed for cooling of the bed and corresponding heating of the fluid, which is then provided directly therefrom to a pump and heater and thence to the second bed for heating, and is then returned to the cooler. In the succeeding portion or phase of the cycle, cooled fluid from the cooler is provided to the first bed for cooling and returned therefrom to the cooler, while fluid is valved in a closed loop through the pump, heater, and the second bed for heating the second bed, thereby reducing the cooling load on the cooler and preventing loss of heat thereto. When the functions of the two beds are switched, heat-conductive fluid flow thereto is also switched, so that in the series mode, fluid from the cooler is provided in series to the second bed, pump, heater and the first bed before being returned to the cooler, and in the closed loop mode, fluid from the cooler is provided from the cooler to the second bed and then returned to the cooler, while additional fluid travels in the closed loop through the pump, heater and the first bed. This four-phase cycle can then be repeated.

Other objects, advantages and novel features of the invention will become apparent from the following detailed description of the invention when considered in conjunction with the accompanying drawings wherein:

DESCRIPTION OF THE PREFERRED EMBODIMENT

Figures 1, 2:
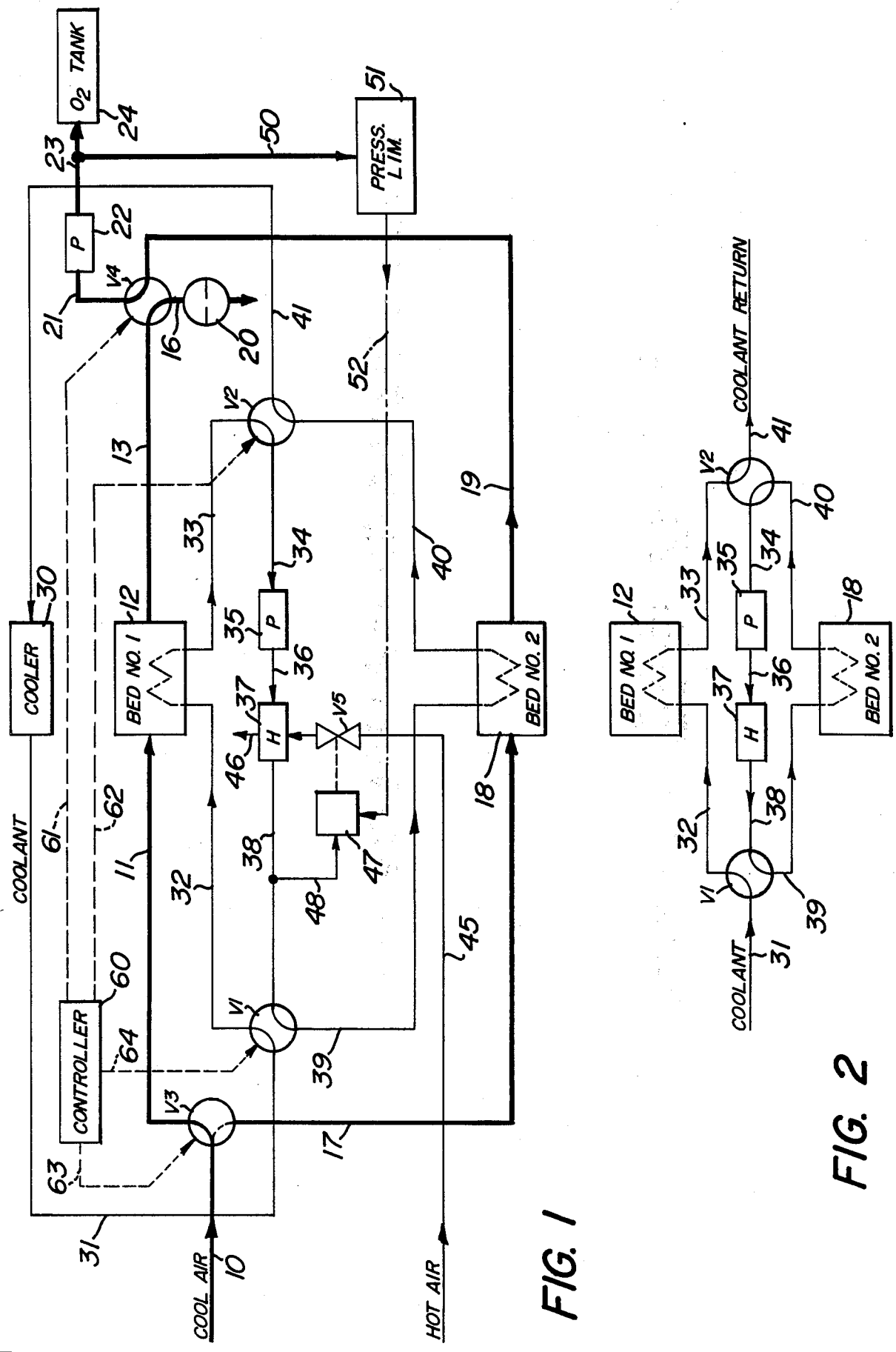
FIG. 1 is a diagrammatic representation of a gas generation system according to the present invention and shown in one phase of cyclic operation.
FIG. 2 is a diagrammatic representation of a portion of the system of FIG. 1 in another phase of cyclic operation.

Referring now to the drawings, wherein like reference characters designate like or corresponding parts throughout the several views, there is shown in FIG. 1 a gas generating system, in particular an oxygen generating system, wherein cool air is supplied (for example, at 50 lb/hr regulated at 25 psig) to the system via a conduit or line 10 connected to two-way valve V3. The position of valve V3 determines whether cool air from conduit 10 is to be provided to sorbent bed 12 via conduit 11 or to sorbent bed 18 via conduit 17. For the position of valve V3 shown in FIG. 1 as an unbroken heavy line, hereinafter referred to as position 1, cool air from conduit 10 is routed to conduit 11 and thence through bed 12. Cool air leaving bed 12 is conveyed by conduit 13 to valve V4 which in the position shown in FIG. 1, hereinafter referred to as position 1, routes this exhaust through conduit 16 to choked orifice 20 from which the cool air is vented. Choked orifice 20 controls the flow rate. For the position of valve V3 shown in FIG. 1 by a broken line, hereinafter referred to as position 2, cool air from conduit 10 is routed by valve V3 through conduit 17 to bed 18. Bed 12 and bed 18 can for example each be a plate fin heat exchanger. Bed 12 and bed 18 each contain sorbent material. The sorbent contained in beds 12 and 18 can for example be a metal chelate such as bis-salicylaldehyde-ethylenediimine-cobalt, also referred to as salcomine, or cobalt-bis-(3-fluorosalicylaldehyde)-ethylenediimine, also referred to as fluomine, which is a derivative of salcomine. Fluomine is preferred because of its rate of sorption and desorption, stability and life expectancy superior to that of its parent compound salcomine. Both compounds are capable of sorbing oxygen from air when cooled and desorbing that sorbed oxygen when heated. Both compounds form a coordination complex ("sorb") with molecular oxygen, thereby removing oxygen from air. Beds 12 and 18 can for example each contain 11 pounds of fluomine, or 15 pounds of salcomine. Beds 12 and 18 are each in heat exchange relationship with a coolant or heat conductive fluid for heating and cooling of each bed. This fluid can for example be a silicate ester base dielectric heat transfer fluid having a specific gravity at 25° C./25° C. of 0.893 to 0.900, viscosity of 1.53 to 1.73 centistokes at 210° F. and 4.05 to 4.40 centistokes at 100° F., and thermal conductivity at 25° C. of $31.4 \times 10^{-5}$ cal.-cm./sec.-cm$^2$°C. Other coolants or heat conductive fluids can be used, but obviously must be capable of flowing at the required temperatures such as those given below. For example, water can be used as coolant for salcomine. The coolant leaves cooler 30 via conduit 31 and is conducted thereby to valve V1 whose position determines which bed 12 or 18 is to be cooled. Cooler 30 contains a circulating system for pumping the coolant and circulating it through the system. For the position of switching valve V1 shown in FIG. 1 and hereinafter referred to as position 1, cooled transfer fluid is provided from cooler 30 via conduit 31 to valve V1 which connects conduit 31 with conduit 32 from which the cool coolant is passed through bed 12 in heat exchange relationship with the sorbent contained therein. Simultaneously, valve V3 in position 1 connects cool air conduit 10 to intake conduit 11 for bed 12, so that while bed 12 is cooled, cool air is flowing therethrough, and through the sorbent therein, from which the cooled sorbent then sorbs oxygen. The oxygen depleted, nitrogen rich air leaving bed 12 passes through conduit 13 to valve V4. Valve V4 in position 1 connects conduit 13 to conduit 16 through which the exhaust air from bed 12 flows through choked orifice 20 which controls the flow rate and from which the exhaust air is vented. Because the cool coolant has cooled bed 12, the coolant absorbs heat from bed 12 in the process. Coolant leaving bed 12 flows through conduit 33 to switching valve V2. For the position of V2 shown in FIG. 1, hereinafter referred to as position 1, valve V2 connects conduit 33 to conduit 34 through which the exhausted coolant flows to pump 35, conduit 36 and heater 37 in succession. Heater 37 heats the coolant passing therethrough which then flows through line 38 to valve V1. With valve V1 in position 1 as shown in FIG. 1, conduit 38 is connected to conduit 39 through which the heated coolant flows to bed 18, through which the heated coolant flows in heat exchange relationship with the sorbent contained therein to heat the sorbent. It is assumed for this description that bed 18 has previously sorbed oxygen from cool air in a manner similar to that described above for bed 12. Heating of bed 18 by heated coolant from heater 37 causes bed 18 to desorb or give up previously sorbed oxygen. Since valve V3 in position 1 closes off or blocks off conduit 17, the oxygen produced by bed 18 flows out of bed 18 through conduit 19. With valve V4 in position 1, line 19 is connected to line 21, and the oxygen from bed 18 flows through conduit 19, valve V4 and conduit 21 to pump 22. Pump 22 provides oxygen under pressure through conduit 23 to oxygen tank 24, and can also provide oxygen under pressure directly to a user. Pump 22 also reduces the pressure in bed 18, for example to 7-8 psia or less, to assist desorption. Coolant leaves bed 18 via conduit or line 40 to valve V2. Since bed 18 and conduits 17 and 19 intially contain air when the desorption is started, it may be desirable to avoid reduced purity of oxygen supplied to conduit 23 by, when desorption begins, briefly venting line 17, line 19 and bed 18 to ambient while oxygen produced by bed 18 removes air therefrom and replaces it with oxygen. This can be accomplished by briefly (such as 10 seconds) venting conduit 23 to ambient while bed 18 is desorbing and pump 22 is operating. During this venting period, tank 24 could be closed off, or be connected directly to the user such as by a regulator sensing pressure on conduit 23, for continued oxygen supply thereto. With valve V2 in position 1, conduit 40 is connected to conduit 41 through which coolant from bed 18 flows to cooler 30 for cooling before again entering conduit 31 for reuse.

With valve V2 in the position shown in FIG. 2, which is opposite from the position shown in FIG. 1 therefor and is hereinafter referred to as position 2, and with valve V1 remaining in position 1 as shown in FIG. 2, cool coolant from conduit 31 is routed through valve V1 to conduit 32, bed 12, and conduit 33 from which valve V2 routes coolant leaving bed 12 directly to coolant return line 41. Thus, coolant now provided to cooler 30 is no longer heated by heater 37, thus reducing the cooling load on cooler 30. With valve V1 in position 1 and valve V2 in position 2, a closed coolant loop for heating bed 18 is formed through conduit 34, pump 35, conduit 36, heater 37, conduit 38, valve V1, conduit 39, bed 18 for heating thereof, conduit 40, and valve V2 which in position 2 connects conduit 40 to conduit 34 through which the coolant leaving bed 18 flows back to pump 35 and heater 37. This closed loop both reduces the cooling load on cooler 30 and avoids loss of heat from heater 37 to cooler 30.

With valves V1, V2, V3 and V4, each in position 1 as shown in FIG. 1, this situation is hereinafter referred to as phase A of the cycle of operation of the present invention. During this phase, bed 12 sorbs oxygen, bed 18 desorbs oxygen and an "open" coolant loop is formed wherein coolant flows serially from cooler 30 through bed 12, heater 37, bed 18, and is returned therefrom to cooler 30. The situation wherein valves V1, V3 and V4 remain in position one, while valve V2 is in position 2 as shown in FIG. 2, is hereinafter referred to as phase B of the cycle. During this phase, bed 12 continues to sorb oxygen, bed 18 continues to desorb oxygen, and a "closed" coolant loop is formed between pump 35, heater 37 and bed 18 for heating bed 18, while cool coolant provided from cooler 30 to cool bed 12 is returned directly therefrom to cooler 30.

For the situation wherein valve V3 is in position 2, valve V4 is in the position opposite to that shown in FIG. 1, which opposite position is hereinafter referred to as position 2, the position of valve V1 is opposite to that shown in FIG. 1, which opposite position is hereinafter referred to as position 2, and valve V2 is in position 2, this situation is hereinafter referred to as phase C of the cycle of operation. During phase C, valve V3 connects conduit 10 to conduit 17 and not to conduit 11, and valve V1 connects conduit 31 to conduit 39, and connects conduit 38 to conduit 32. Also, valve V2 connects conduit 33 to conduit 41, and connects conduit 40 to conduit 34. Valve V4 connects conduit 13 to conduit 21, and connects conduit 19 to conduit 16. Thus, bed 18 now receives cool air from conduit 10 and cool coolant from cooler 30, while bed 12 receives heated coolant from heater 37. Accordingly, bed 18 now sorbs oxygen from air while bed 12 desorbs oxygen which is provided therefrom to pump 22 and tank 24. Oxygen-depleted air leaving bed 18 is vented to ambient via orifice 20 and oxygen leaving bed 12 is connected to pump 22 and tank 24. Air can be removed from conduits 11 and 13 and from bed 12 at the start of desorption by brief venting such as was described above for bed 18 during phase A. Coolant now flows in an open loop from cooler 30 to valve V1, bed 18, valve V2, pump 35, heater 37, valve V1, bed 12, and valve V2 in succession before being returned to cooler 30 for cooling. Bed 18 is thus cooled by cool coolant from cooler 30 and bed 12 is heated by heated coolant from heater 37.

With valves V1, V3 and V4 remaining in position 2, while the position of valve V2 is changed to position 1, the system is now in phase D. In phase D, valve V1 connects conduit 31 to conduit 39 and connects conduit 38 to conduit 32, and valve V2 connects conduit 33 to conduit 34 and connects conduit 40 to conduit 41. Thus coolant from cooler 30 is provided to bed 18 and returned directly therefrom to cooler 30, while a closed coolant loop heating bed 12 is formed between pump 35, heater 37 and bed 12 similar to that shown in FIG. 2 for bed 18 in phase B. Accordingly, bed 18 continues to sorb, and bed 12 continues to desorb, oxygen.

Phases A, B, C and D in sequence constitute one cycle of operation of the embodiment. Following phase D, the positions of valves V1, V3 and V4 are each changed to position 1 for the respective valve, while valve V2 remains in position 1, so that the system returns to phase A to begin a new cycle. Phases A, B, C and D and their sequencing are summarized in the table below:

TABLE

| Phase | Exchanger Function | | Valve Position | | | |
|---|---|---|---|---|---|---|
| | Bed 12 | Bed 18 | V1 | V2 | V3 | V4 |
| A | Sorb | Desorb-open loop | 1 | 1 | 1 | 1 |
| B | Sorb | Desorb-closed loop | 1 | 2 | 1 | 1 |
| C | Desorb-open loop | Sorb | 2 | 2 | 2 | 2 |
| D | Desorb-closed loop | Sorb | 2 | 1 | 2 | 2 |

The sequencing of the positions of each of the valves V1, V2, V3 and V4, the operation of each bed 12 and 18, and the means by which the desorbing bed is heated, by open series or by closed coolant loop, for each phase of the cycle is given in the table.

The individual position of each valve V1, V2, V3 and V4 is determined by controller 60 which is connected to and controls the position of each of the above valves via respective control line 64, 62, 63 and 61, respectively, as shown in FIG. 1. Controller 60 is a conventional device for controlling and setting the positions of valves V1, V2, V3 and V4 in sequence as required, as is shown in the table above. For example, where valves V1, V2, V3 and V4 are electrically operated, controller 60 can be a timer and control lines 61, 62, 63 and 64 can be electrical control lines therefrom. Controller 60 can for example be a timer or sequencer.

FIG. 1 shows the coolant flow for phase A. Bed 12 has just started sorbing and bed 18 has just started desorbing. The coolant flows in an "open", series loop through the system. FIG. 2 shows the coolant path during phase B. Phase B should begin when the coolant outlet temperature of the absorbing bed 12 equals the coolant outlet temperature of the desorbing bed 18. During this configuration, which continues until the end of the half cycle including phases A and B after which the functions of beds 12 and 18 are switched, the coolant entering the system from cooler 30 flows through bed 12, then is returned to the cooler without flowing through the desorbing bed. The other part of the coolant loop is now contained in closed loop with circulation being provided by coolant pump 35. Phase D should begin when the coolant outlet temperature of the absorbing bed 18 equals the coolant outlet temperature of the desorbing bed 12. During phases B and D, none of the heat provided by heater 37 is lost to cooler 30. Phases A and C ease the cooling and heating loads on cooler 30 and heater 37 respectively when the bed 12, 18 functions are being switched and the cooled absorbing bed is still at or near the higher desorbing temperature; heat from the absorbing bed is provided to the desorbing bed instead of cooler 30, but this advantage is lost when the desorbing bed becomes warmer than the absorbing bed.

For example, the duration of phases A, B, C and D can be 0.65, 2.85, 0.65 and 2.85 minutes respectively for a cycle of 7.0 minutes. In other words, phase A would begin with the new cycle, phase B would begin 0.65 minutes into the cycle, phase C would begin 3.5 minutes into the cycle, and phase D would begin 4.15 minutes into the cycle. Seven minutes into the cycle, a new cycle would begin with phase A. Shorter cycle times can increase oxygen production with less sorbent. However, a higher heat load would be imposed on cooler 30. Other times and durations for the various phases and for the cycle can be substituted as desired, although it is preferred to have the transition between phases A and B and between phases C and D occur when the falling coolant outlet temperature of the absorbing bed equals the rising coolant outlet temperature of the desorbing bed. This can be accomplished by appropriate timing of the durations of phases A and C.

Conduit 23 or tank 24 can be connected to various users or devices utilizing oxygen.

Heater 37 can be a heater exchanger which effects heat exchange between hot air or other hot fluid, and coolant received from conduit 36. Hot air is supplied to heater 37 via a conduit 45. Temperature control valve V5 controls the amount of hot air entering heater 37. Hot air exits heater 37 via conduit 46 from which the used hot air is vented to ambient. Valve V5 in turn is controlled by controller 47 which, via line 48 connected to conduit 38, senses the temperature of coolant exiting heater 37 via conduit 38 and is operatively connected such as by a control line to valve V5 to control the setting of valve V5 according to the variation of the sensed temperature of the heated coolant from the desired temperature, to accomplish the desired temperature for the heated coolant. Thus, the flow of hot air to heater 37 would be increased to raise the temperature of the heated coolant leaving heater 37, and decreased to lower the temperature. Alternatively, controller 47 can be directly connected to conduit 38 to sense the temperature of the heated coolant exiting heater 37.

Excess oxygen production is eliminated by the operation of pressure limiter 51, which senses the pressure of the oxygen in tank 24 via conduit 50 and controls oxygen production as a function of tank pressure. When the oxygen tank 24 pressure is too high, indicating that the system is producing too much oxygen, pressure limiter 51, via control line 52 signals controller 47 so that flow of hot air through heater 37 is reduced or cut off. When oxygen tank 24 pressure drops sufficiently as a result of the reduced oxygen production because of lowered temperature of the heated coolant, pressure limiter 51 permits controller 47 to increase the temperature of coolant leaving heater 37. For example, as tank 24 pressure increases beyond a preset value, such as 1900 psig, pressure limiter 51 can change the temperature sensing calibration of controller 47 downward. As a result, valve V5 reduces hot air flow through heater 37. The temperature of the coolant provided to desorbing bed 12 or 18 is thereby reduced, thus reducing oxygen production. This process is reversed when tank 24 pressure drops below a second preset value, such as 1500 psi. Pressure limiter 51 thereby limits or matches oxygen production to demand by varying the coolant desorb temperature.

Where controller 47 and valve V5 are appropriately configured, wherein valve V5 is controlled by pressure controlled by controller 47, pressure limiter 51 can allow flow from, and thus reduce control pressure at, the control head of valve V5 to close the valve when tank 24 pressure is too high. As a result of closing valve v5, the desorb coolant temperature is then reduced low enough that the sorbent in the desorbing bed 12 or 18 produces less or no oxygen. During this situation, tank 24 can supply oxygen to a user via a regulator, which can be activated by low oxygen production and consequent pressure. When tank 24 pressure falls sufficiently low pressure limiter 51 would then stop bleeding off the control pressure from valve V5, which would then be controlled by controller 47 on the basis of coolant temperature alone, so that maximum oxygen production occurs. Controller 47 can then also bleed off the control pressure from valve V5 when the sensed coolant temperature is too high.

Salcomine should be at 40°–80° F. for best sorption and, 140°–180° F., preferably 180° F., for best desorption. Fluomine should be at 60°–120° F., preferably 75° F., for best sorption and, 220°–225° F. for best desorption. Accordingly, cooler 30 and heater 37 should provide coolant to the respective sorbing and desorbing beds at these temperatures for the appropriate sorbent material. If hot air is used in heater 37 to heat the coolant, the air can be for example supplied at 400° F. Cool air can be supplied to a fluomine bed at relatively low pressure, such as 15–25 psig at 40–50 lb/hr, and to a salcomine bed at a higher pressure, such as 135 psig at 80 lb/hr. A regulator on conduit 10 can be used to maintain the proper pressure.

For initial system startup, neither bed 12 nor 18 would be at the desorbing temperature. Accordingly, it is not necessary to utilize the "open" coolant loop during initial system operation, and there could be an initial short time delay before oxygen is first produced. Also, it may be desirable to briefly use pump 22 at startup to remove air from the bed 12 or 18 which will first be desorbing before actual desorption therefrom, if that bed is ready to desorb oxygen at startup.

The system of FIGS. 1 and 2 can be utilized in an aircraft and can utilize aircraft services. For example, cooler 30 and coolant can be provided from the aircraft environmental control system or temperature control system. Many aircraft are equipped with a liquid coolant thermal loop, for temperature control of avionics, which can be so used. Coolant flows would then be redirected back to the aircraft environmental or temperature control system from which the coolant was taken. The cool air needed as an oxygen source for the sorbent beds 12 and 18 can be supplied by an aircraft air conditioning system, or can be cooled bleed air from the aircraft engine which has been cooled by ram air in an aircraft heat exchanger. Hot air for heating the coolant can be hot engine bleed air which has not been cooled, or can be air from a hot air manifold used for temperature control of the aircraft air conditioning system, or can be obtained from an appropriate manifold of the aircraft environmental control system. Pump 22 can be a compressor which provides oxygen at the proper pressure (such as 120 psig) to aircrew demand regulator(s) as well as refill (for example with additional compression) tank 24, which can for example be a high-pressure (such as 1800 psig) storage tank. Tank 24 could then be provided with a regulator which would automatically supply oxygen from the tank to the aircrew when the supplied oxygen pressure would drop below a preset value, for example 90 psig.

In summary, operation of the foregoing invention is as follows. The invention separates a gas such as oxygen from a gas mixture such as air. A sorbent, such as fluomine or salcomine, contained in a fixed bed 12 sorbs the gas from the mixture while cooled; simultaneously, a second bed 18 of sorbent which previously absorbed the gas is heated and the gas is desorbed from the sorbent. After a preset time duration, the functions of the beds 12 and 18 are switched. By using two beds 12 and 18, one sorbing while the other is desorbing, a continuous flow of the gas is obtained. Cooling and heating are provided in a four-phase cycle to beds 12 and 18 by a heat-conductive fluid and a cooler 30 and a heater 37 therefor. During the first phase, the mixture is provided by valve V3 to bed 12 and the mixture depleted of the gas is vented therefrom, while the fluid flows sequentially through cooler 30, bed 12, heater 37 and bed 18 and is returned to cooler 30. The fluid, heated by bed 12 and heater 37, heats bed 18, so that gas sorbed during the previous cycle is now desorbed. During the second phase, there are two separate fluid loop flows. One loop connects bed 12 and cooler 30, while the other loop connects bed 18 and heater 37. Bed 12 continues to receive and sorb gas from the mixture, and bed 18 continues to desorb gas. With the third phase, the bed 12 and 18 functions are switched; bed 12 now desorbs the gas and bed 18 now sorbs the gas. Heat-conductive fluid flows sequentially through cooler 30, bed 18, heater 37, and bed 12 and is returned to cooler 30. The gas mixture is now provided by valve V3 to bed 18, and the depleted gas mixture is vented therefrom via valve V4. Fluid cooled by cooler 30 and bed 12 cools bed 18 for sorption, and fluid heated by heater 37 and previously heated bed 18 heats bed 12 for desorption. During the fourth phase, two separate fluid loops are formed. One loop connects bed 18 and cooler 30, while the other loop connects bed 12 and heater 37. Bed 12 continues to be heated and to desorb previously sorbed gas, while bed 18 continues to be cooled and to sorb the gas from the mixture. After the fourth phase is completed, the system returns to the first phase, and a new cycle begins. The flow path of the heat-conductive fluid is controlled by valves V3 and V4, and the flow paths of the gas mixture and of the gas is controlled by valves V1 and V2.

It should be understood that the present invention can accomplish other gas separations of other gases from other gas mixtures, besides separating oxygen from air. The present invention is suitable for any gas separation where an appropriate sorbent is available which requires heating and cooling for gas sorption and desorption, irrespective of whether heating or cooling is required for sorption or for desorption. For such applications, many of the considerations such as phase durations discussed above for an oxygen systen could also apply to other gas separating or generating systems, although phase duration, cycle duration, sorb and desorb temperatures, and heating and cooling requirements would depend greatly on the properties, characteristics and requirements of the sorbent material used. Furthermore, other cycle times, phase durations, flow rates, sorbent weights, pressures, coolants and temperatures other than those disclosed above can be used in the present invention.

Thus there has been provided a novel gas separating system capable of separating a desired gas from a gas mixture. In particular, the coolant system of the gas separating system conserves heat and reduces the load on the system cooler and heater. When sorbing and desorbing functions of the two sorbent beds are first switched, the system in phase A and C utilizes an open or series coolant loop to transfer heat from the still-warm bed now being cooled to the bed which had previously been cooled but is now being heated. This helps accomplish the switch in bed temperatures necessary for proper operation of the gas separation system, reducing the load on the system cooler and heater. By transferring heat from the bed being cooled to the bed being heated, the amount of heating and cooling for each bed is reduced, particularly in view of the switched bed functions and correspondingly switched heating and cooling requirements. At an appropriate time, when the beds are approaching their respective appropriate sorb and desorb temperatures, the system in phases B and D enters a closed or parallel coolant loop mode, wherein each bed is separately heated or cooled within its own closed coolant loop, without heat loss from the heating loop to the cooling loop and consequent increased loads on the system heater and cooler. The reduced loads on cooler and heater result in reduced required capacity therefor, thus reducing overall system weight.

Obviously, many modifications and variations of the present invention are possible in light of the above teachings. It is therefore to be understood that within the scope of the appended claims the invention may be practiced otherwise than as specifically described.

What is claimed is:

1. A method for separating a gas from a gas mixture, comprising the sequential steps of:

first directing a heat-conductive fluid sequentially through a cooler, a first sorber, a heater, a second sorber, and returning said fluid to said cooler, while flowing the gas mixture into said first sorber, for a first preset period of time;

second directing a portion of said fluid through said cooler and said first sorber and returning said portion to said cooler, while also directing the remainder of said fluid separately through said heater and said second sorber and returning said remainder to said heater, and while flowing the gas mixture through said first sorber, for a second preset period of time following said first period;

third directing said fluid sequentially through said cooler, said second sorber, said heater and said first sorber and returning said fluid to said cooler, while flowing the gas mixture through said second sorber and removing the gas from said first sorber, for a third preset period of time following said second period;

fourth directing a portion of said fluid through said cooler and said second sorber and returning said portion to said cooler, while also directing the remainder of said fluid separately through said heater and said first sorber and returning said remainder to said heater, and while flowing the gas mixture through said second sorber and removing the gas from said first sorber, for a fourth preset period of time following said third period;

fifth subsequently repeating the first step while removing the gas from said second sorber; and sixth subsequently repeating the second step while removing the gas from said second sorber.

2. Apparatus for separating a gas from a gas mixture, comprising:

first conduit means for receiving the gas mixture;

second conduit means containing a heat-conductive fluid;

first and second sorbing means operatively connected to said first and second conduit means maintaining the mixture and said fluid in discrete and separate paths for sorbing the gas at a first preset temperature and desorbing the gas at a second preset temperature;

first valve means operatively connected in said first conduit means having first and second positions for conducting the gas mixture respectively to said first and second sorbing means;

second valve means operatively connected between said first and second sorbing means and adapted to be connected to a user and a vent and having a first position for conducting the gas from said first and second sorbing means respectively to the vent and user, and a second position for conducting the gas from said first and second sorbing means respectively to the user and vent;

cooler means operatively connected in said second conduit means for reducing the temperature of said fluid passing therethrough;

heater means operatively connected in said second conduit means for increasing the temperature of said fluid passing therethrough;

third valve means operatively connected in said second conduit means having a first position for directing said fluid from said cooler means and said heater means respectively to said first and second sorbing means, and a second position for conducting said fluid from said cooler means and said heater means respectively to said second and first sorbing means;

fourth valve means operatively connected in said second conduit means having a first position for directing said fluid from said first and second sorbing means respectively to said heater means and said cooler means, and a second position for conducting said fluid from said first and second sorbing means respectively to said cooler means and said heater means;

first pump means operatively connected in said second conduit means for circulating said fluid; and controller means operatively connected to said valve means for producing sequential first, second, third and fourth control signals, said first and third signals respectively maintaining all said valve means in said first and second positions, and said second signal maintaining said first, second, and third valve means in said first position and said fourth valve means in said second position, and said fourth signal maintaining said first, second, and third valve means in said second position and said fourth valve means in said first position.

3. Apparatus as recited in claim 2 wherein said first and second sorbing means comprise first and second beds of sorbent material capable of sorbing the gas at the first temperature and of desorbing the gas at the second temperature.

4. Apparatus as recited in claim 3 wherein:
the gas mixture is air;
the gas is oxygen; and
said sorbent material is selected from the group consisting of fluomine and salcomine.

5. Apparatus as recited in claim 2, further comprising second pump means connected to said second valve means for pumping the gas to the user.

6. Apparatus as recited in claim 2 wherein said heater means comprises:

a heat exchanger having first and second flow paths in heat transfer relationship to each other, said first path operatively connected in said second conduit means to conduct said heat-conductive fluid between said third and fourth valve means and said second path adapted to conduct a stream of hot fluid therethrough for heating said heat-conductive fluid with the stream;

fifth valve means operatively connected to said heat exchanger and adapted to receive the stream for controlling the flow of the stream to said heat exchanger; and control means operatively connected to said fifth valve means and between said heat exchanger and said third valve means for controlling flow of the stream through said fifth valve means according to variation of the temperature of said heat-conductive fluid leaving said heat exchanger from a preset value.

7. Apparatus as recited in claim 6 wherein said heating means further comprises pressure limiting means operatively connected to said control means and adapted to be connected to the user for reducing flow of the stream through said fifth valve means when the pressure of the gas supplied to the user exceeds a preset limit.

8. Apparatus as recited in claim 2, further comprising a choked orifice operatively connected to said second valve means for controlled alternate venting of said first and second sorbing means.

* * * * *